United States Patent [19]

Wykes et al.

[11] 4,098,393

[45] Jul. 4, 1978

[54] APPARATUS FOR LATERALLY SEPARATING ELONGATED MAGNETIC ELEMENTS

[75] Inventors: Robert D. Wykes; Colin Roy, both of Worcester, Mass.

[73] Assignee: Morgan Construction Company, Worcester, Mass.

[21] Appl. No.: 790,052

[22] Filed: Apr. 22, 1977

[51] Int. Cl.² ........................................... B65G 47/26
[52] U.S. Cl. ................................. 198/458; 198/780; 83/418
[58] Field of Search ............... 198/458, 598, 619, 690, 198/780; 83/418

[56] References Cited

U.S. PATENT DOCUMENTS

| 1,838,592 | 12/1931 | Sylvester | 198/780 |
| 2,843,249 | 7/1958 | Heiden | 198/458 |
| 2,939,568 | 6/1960 | Israelson et al. | 198/780 |

FOREIGN PATENT DOCUMENTS

| 297,320 | 10/1928 | United Kingdom | 198/780 |

*Primary Examiner*—Evon C. Blunk
*Assistant Examiner*—Jeffrey V. Nase
*Attorney, Agent, or Firm*—Thompson, Birch, Gauthier & Samuels

[57] ABSTRACT

An apparatus for laterally separating a group of elongated magnetic elements, for example steel bars which are moving longitudinally along a conveyor. A rotatable fanning roll extends transversally across the path of the bars. The fanning roll has a magnet associated therewith. The magnet attracts the bars towards the fanning roll while simultaneously creating repulsion forces tending to laterally separate the bars. A deflecting roll located in advance of the fanning roll is employed to deflect the bars out of their normal path of travel in relation to the surface of the fanning roll to thereby produce a momentary separation between the front ends of the bars and the fanning roll. During this momentary separation, the magnetically induced repulsion forces are not impeded by frictional resistance between the bars and the surface of the fanning roll, and this in turn improves the resulting lateral bar separation.

5 Claims, 7 Drawing Figures

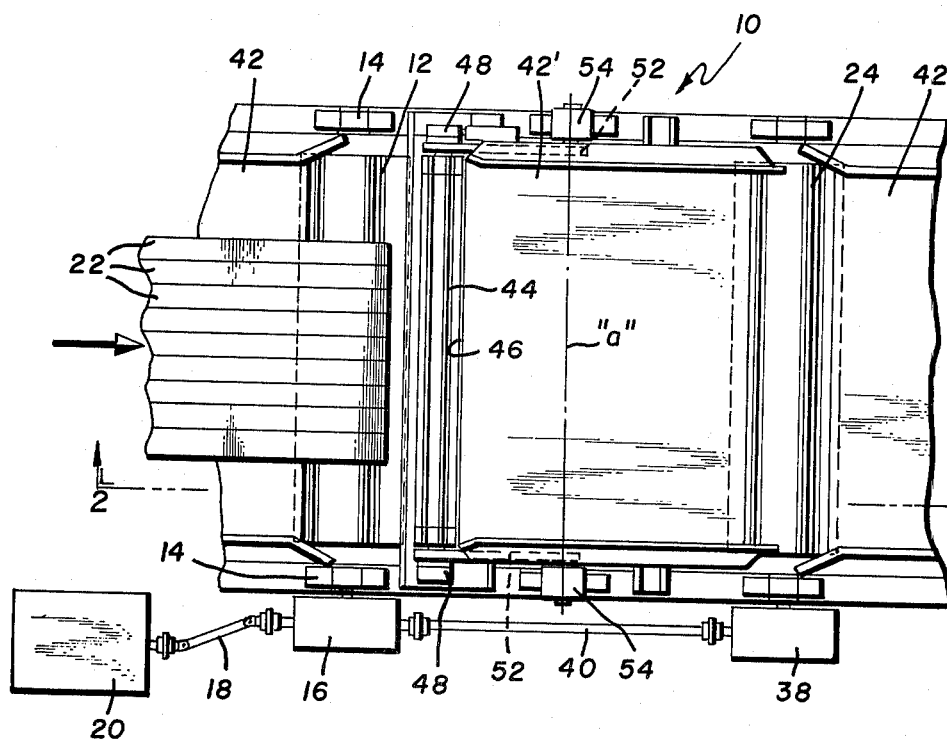
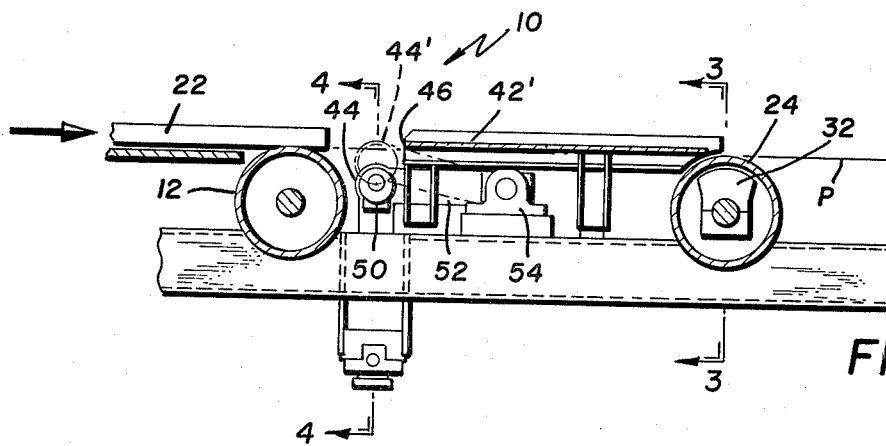
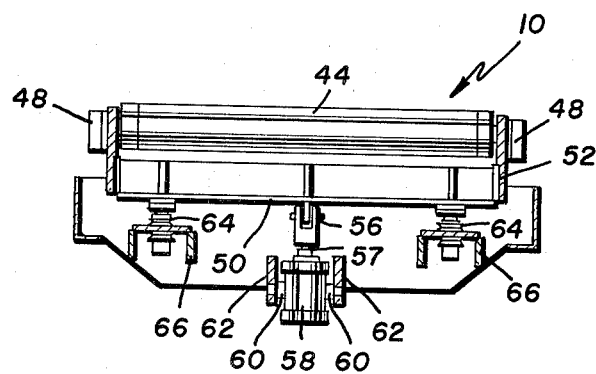

APPARATUS FOR LATERALLY SEPARATING ELONGATED MAGNETIC ELEMENTS

DESCRIPTION OF PREFERRED EMBODIMENT

This invention relates generally to material handling systems, and is concerned in particular with an apparatus for laterally separating elongated magnetic elements such as for example steel bars in a rolling mill.

Bars leaving the cooling bed of a rolling mill usually are conveyed to a shear where they are subdivided into smaller lengths. Such shears normally utilize grooved knives. The grooves in the knives approximate the size and shape of the bars. If the bars approach the shear without any preliminary guidance or separation, they must be man-handled individually into the grooves of the knives or into similar grooves in a comb-like guide located just ahead of the shear. Such manual operations are both difficult to perform and very time consuming.

In the past, different attempts have been made at providing equipment for guiding or manipulating the bars preparatory to their being sheared. Examples of these include the provision of grooved conveyor rolls operating on the principle of mechanical separation, and magnetic fanning rolls operating on the principle of magnetic repulsion.

The use of grooved conveyor rolls is unsatisfactory because of the need for varying groove shapes, sizes and spacing to suit different types of bars. The use of magnetic fanning rolls has been found to be unsuitable for round, square or similar shaped bars because the frictional resistance of the bars engaging the surfaces of the fanning rolls cannot be overcome satisfactorily by the magnetically induced repulsion forces tending to separate the bars.

The present invention provides a solution to the problem associated with magnetic fanning rolls by providing a means for momentarily separating or lifting the front ends of the bars from the surface of the fanning roll, thereby allowing the magnetically induced repulsion forces to operate free of frictional resistance until the bars are attracted against the surface of the fanning roll.

In the preferred embodiment to be hereinafter described in greater detail, this momentary separation is achieved by positioning an adjustable lift roll ahead of the fanning roll. As bars travel along the conveyor towards the shear, the adjustable lift roll is raised. The bars are deflected from their normal path of travel by the lift roll and are raised above the elevation of the fanning roll. As the front ends of the bars continue to move forwardly, they are eventually attracted back against the fanning roll by the magnetic means associated therewith, while at the same time experiencing lateral separation as the result of the magnetically induced repulsion forces. Frictional resistance does not impede the separation of the front ends during the brief period of time that the bars are separated from the surface of the fanning roll.

A preferred embodiment of the invention will now be described in greater detail with reference to the accompanying drawings wherein:

FIG. 1 is a partial plan view of an apparatus embodying the concepts of the present invention;

FIG. 2 is a sectional view taken along lines 2—2 of FIG. 1;

Figure 3:
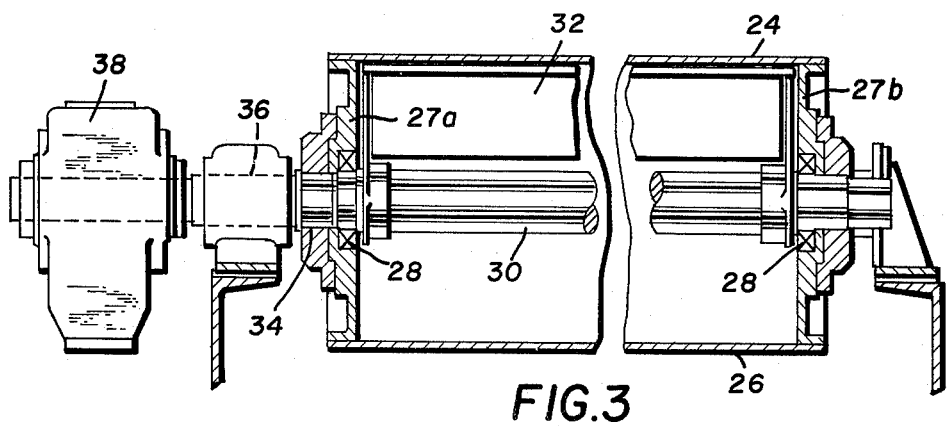
Figure 5A:
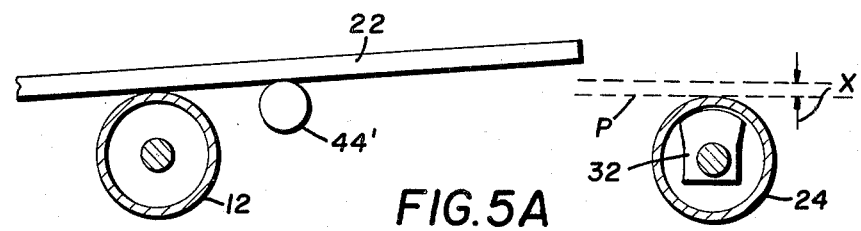
Figure 5B:
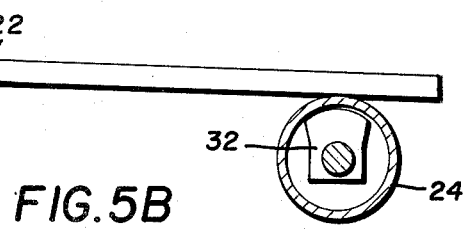
Figure 6:
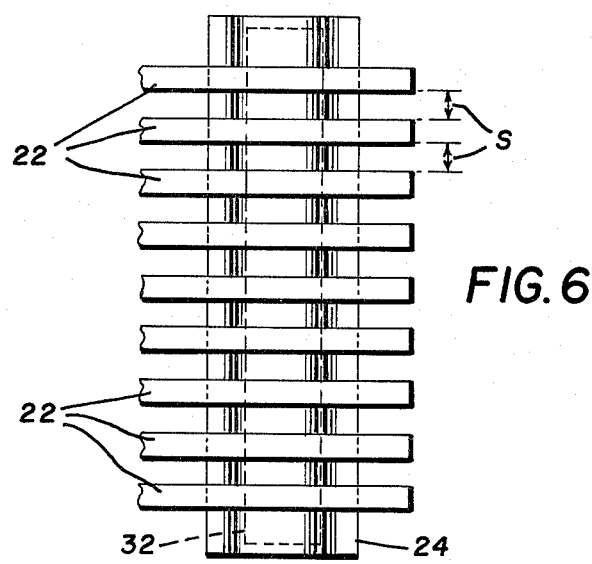

FIGS. 3 and 4 are sectional views taken along lines 3—3 and 4—4 of FIG. 2;

FIGS. 5A and 5B are schematic illustrations showing the operation of the lift roll; and, FIG. 6 is a schematic plan view illustrating the resulting lateral separation of bars as they pass over the fanning roll.

Referring initially to FIGS. 1-4, there is generally indicated at 10 a conveyor of the type employed to longitudinally transfer elongated magnetic elements such as steel bars from the delivery end of a cooling bed to a shear. The cooling bed and shear are conventional pieces of equipment which are not shown in the drawings.

The conveyor 10 includes a plurality of driven carrier rolls 12, only one being shown in the drawings. The rolls 12 are journalled for rotation between bearings 14 and are driven in any conventional manner, for example via a gear box 16 and connection shaft 18 by means of a motor 20. The driven carrier rolls 12 serve to longitudinally propel groups of bars 22.

A magnetic fanning roll 24 is employed to impart a desired lateral separation between the bars 22. The fanning roll can be of any known conventional construction, an example of which is shown in greater detail in FIG. 3. Here it will be seen that the roll 24 has a cylindrical roll barrel 26 which has end plates 27a, 27b journalled for rotation by means of roller bearing assemblies 28 on a fixed shaft 30. The shaft 30 carries a nonrotating magnet 32 which extends over substantially the entire interior width of the roll barrel 26. The end plate 27a is connected as by welding as at 34 to a laterally extending shaft 36 which is in turn driven via a gear box 38 connected to the gear box 16 by another intermediate coupling shaft 40. Alternatively, the fanning roll 24 can rotate freely without associated drives. Also, it will be understood that several fanning rolls can be employed in sequence where one is not sufficiently effective to achieve the desired lateral separation between adjacent bars.

The spaces between the carrier rolls 12 are filled by conventional fixed apron plates 42. Similar but somewhat shorter apron plates 42' are located immediately upstream from each fanning roll 24. The apron plates 42, 42' are located in a horizontal plane slightly below the top circumference of the rolls 12, 24.

A lift roll 44 is located at the space between the forward edge 46 of the apron plate 42' and the upstream carrier roll 12. The lift roll 44 is supported for free rotation between bearings 48 carried on a frame 50. The frame has rearwardly extending legs 52 which are pivotably supported by bearings 54. The pivotal axis "a" of the bearings 54 extends transversely across the conveyor and is parallel to the rotational axis of the rolls 12, 24 and 44.

Preferably, the lift roll 44 has a diameter which is smaller than the diameters of the carrier rolls 12 and the fanning roll 24. This minimizes the space between the forward edge 46 of the apron plate 42' and the upstream carrier roll 12, and also minimizes frictional resistance to lateral bar movement.

The frame 50 is pivotably connected as at 56 to the piston rod 57 of a cylinder 58. The cylinder 58 is in turn pivotably supported as at 60 on stationary braces 62.

Extension of the piston rod 57 causes the frame 50 to pivot upwardly about axis "a" to place the lift roll 44 in an elevated position as indicated in dotted at 44' in FIG. 2. When in this raised position, the lift roll 44 is above a horizontal plane "P" tangent to the upper circumferences of the carrier rolls 12 and the fanning rolls 24. The distance that the elevated lift roll protrudes above plane "P" is shown schematically at "x" in FIG. 5A. When the lift roll 44 is lowered, the downward descent of the frame 50 is cushioned by small shock absorbers 64 carried on other stationary supports 66.

Referring now to FIGS. 5A, 5B and 6, it will be seen that the invention operates in the following manner: as bars 22 approach the fanning roll 24, the lift roll 44 is raised to its uppermost position as indicated at 44'. This causes the front ends of the bars 22 to be deflected from their normal path of travel above the horizontal plane P. As the front ends of the bars continue to move forward, they are eventually attracted back towards the fanning roll 24 by the magnet 32, as shown in FIG. 5B. However, during the interval of time it takes for the front ends of the bars to drop through distance "x", frictional resistance does not impede the separation of the front ends as a result of the magnetically induced separation forces being created by the magnet 32. The net effect is the creation of substantially uniform spaces "s" between each of the bars 22 as shown in FIG. 6. After the front ends of the bars have passed the fanning roll 24, the lift roll 44 is returned to its lowered position as shown in FIGS. 2 and 4.

While the disclosed lift roll 44 is considered to be the preferred means for elevating the front ends of the bars 22, it will be appreciated that other equivalent means might also be employed without departing from the basic concepts of the invention. For example, it might be possible to employ an overhead magnet or magnetic roller to temporarily lift the bars above the plane P.

It is our intention to cover these and any other changes or modifications to the embodiment herein chosen for purposes of disclosure which do not depart from the spirit and scope of the invention as claimed.

We claim:

1. Apparatus for laterally separating a group of elongated magnetic elements moving longitudinally along a conveyor surface, comprising: a rotatable fanning roll extending transversally across the path of the elements, said fanning roll having magnetic means associated therewith for attracting the elements against said fanning roll while simultaneously creating repulsion forces tending to laterally separate the elements; and deflecting means for lifting the longitudinally moving elements above the conveyor surface until the elements are attracted against the surface of said fanning roll by said magnetic means.

2. The apparatus of claim 1 wherein said fanning roll is aligned horizontally with a plurality of carrier rolls, at least some of which are driven, the said fanning roll and said carrier rolls providing the conveyor surface for the elongated elements.

3. The apparatus of claim 2 wherein said deflecting means is comprised of a rotatable lift roll preceding said fanning roll, and means for vertically adjusting said lift roll between a lowered inoperative position beneath the conveyor surface and a raised operative position protruding thereabove.

4. The apparatus of claim 3 wherein the diameter of said lift roll is less than the diameter of said fanning roll.

5. Apparatus for laterally separating a group of longitudinally moving elongated magnetic elements comprising: a roller conveyor having a plurality of horizontally aligned carrier rolls, at least some of which are driven, said carrier rolls defining a conveyor surface for moving the elements longitudinally; a rotatable fanning roll extending transversally across the path of the elements and aligned horizontally with the carrier rolls, said fanning roll having magnetic means associated therewith for attracting the elements against said fanning roll while simultaneously creating repulsion forces tending to laterally separate the elements; a lift roll preceding said fanning roll, said lift roll having a diameter less than that of said fanning roll; and, means for vertically adjusting the lift roll between a lowered inoperative position beneath the conveyor surface and a raised operative position protruding thereabove to lift the longitudinally moving elements above the conveyor surface until the elements are attracted against the surface of said fanning roll by said magnetic means.

* * * * *